US011494734B2

(12) United States Patent
Sodhani et al.

(10) Patent No.: US 11,494,734 B2
(45) Date of Patent: Nov. 8, 2022

(54) AUTOMATICALLY DETERMINING INVENTORY ITEMS THAT MEET SELECTION CRITERIA IN A HIGH-DIMENSIONALITY INVENTORY DATASET

(71) Applicant: ILA DESIGN GROUP, LLC, Houston, TX (US)

(72) Inventors: Vikas Sodhani, Houston, TX (US); Jim Wagner, San Diego, CA (US)

(73) Assignee: ILA DESIGN GROUP LLC, Houston, TX (US)

( * ) Notice: Subject to any disclaimer, the term of this patent is extended or adjusted under 35 U.S.C. 154(b) by 499 days.

(21) Appl. No.: 16/568,197

(22) Filed: Sep. 11, 2019

(65) Prior Publication Data
US 2021/0073732 A1    Mar. 11, 2021

(51) Int. Cl.
*G06Q 10/08* (2012.01)
*G06F 17/16* (2006.01)
*G06Q 30/02* (2012.01)

(52) U.S. Cl.
CPC ......... *G06Q 10/0875* (2013.01); *G06F 17/16* (2013.01); *G06Q 30/0283* (2013.01)

(58) Field of Classification Search
CPC . G06Q 10/0875; G06Q 30/0283; G06F 17/16
See application file for complete search history.

(56) References Cited

U.S. PATENT DOCUMENTS 5,647,058 A * 7/1997 Agrawal ............... G06V 10/40
5,778,362 A * 7/1998 Deerwester ........... G06F 16/33
707/999.005

(Continued)

FOREIGN PATENT DOCUMENTS

CA     2704396 A1  * 11/2010
CN     102254028 A  * 11/2011
(Continued)

OTHER PUBLICATIONS

Wang, Hanyou. "User Classified Algorithm and Model Based Gold Jewelry Design Definition." Cluster computing 22.Suppl 3 (2018): 6741-6753. Web. (Year: 2018).*

(Continued)

*Primary Examiner* — Ashford S Hayles
(74) *Attorney, Agent, or Firm* — Artegis Law Group, LLP

(57) ABSTRACT

An inventory application automatically explores a high-dimensionality inventory dataset associated with an inventory of diamonds to identify one or more diamonds that meet one or more selection criteria associated with a user. The inventory application determines a user profile that reflects one or more selection criteria associated with a user and maps the user profile to one or more templates. A given template is an abstract representation of a diamond that meets the selection criteria to some degree. The inventory application projects the one or more templates to one or more corresponding locations in an N-dimensional space representing all diamonds included in the inventory of diamonds. The inventory application identifies one or more diamonds within the inventory space that reside proximate to each location associated with the one or more templates and returns data associated with these diamonds to the user.

20 Claims, 7 Drawing Sheets

(56) References Cited

U.S. PATENT DOCUMENTS

| | | | |
|---|---|---|---|
| 5,941,944 A * | 8/1999 | Messerly | G06F 16/10 707/999.005 |
| 6,098,065 A * | 8/2000 | Skillen | G06Q 30/02 707/999.005 |
| 6,996,546 B1 * | 2/2006 | Giles | G06Q 30/0283 705/401 |
| 7,318,053 B1 * | 1/2008 | Cha | G06K 9/627 707/E17.14 |
| 7,668,827 B2 * | 2/2010 | Gould | G06F 16/168 707/769 |
| 7,761,472 B2 * | 7/2010 | Cha | G06K 9/627 707/788 |
| 8,117,213 B1 * | 2/2012 | Nakano | G06F 16/2264 707/715 |
| 9,251,524 B2 * | 2/2016 | Moritz | G06Q 30/02 |
| 9,870,199 B2 * | 1/2018 | Kumar | H03M 7/30 |
| 10,043,109 B1 * | 8/2018 | Du | G06K 9/6267 |
| 10,339,586 B1 * | 7/2019 | Khobragade | G06Q 30/0631 |
| 10,548,377 B1 * | 2/2020 | Weissman | G01N 21/87 |
| 2002/0138481 A1 * | 9/2002 | Aggarwal | G06Q 30/02 |
| 2002/0147703 A1 * | 10/2002 | Yu | G06F 16/2264 |
| 2003/0187616 A1 * | 10/2003 | Palmadesso | G06F 17/16 702/181 |
| 2004/0006559 A1 * | 1/2004 | Gange | G16C 20/40 |
| 2004/0006568 A1 * | 1/2004 | Ooi | G06F 16/283 |
| 2004/0068417 A1 * | 4/2004 | Sevdermish | G06Q 30/0278 702/81 |
| 2004/0225638 A1 * | 11/2004 | Geiselhart | G06F 16/30 |
| 2005/0066182 A1 * | 3/2005 | Jonas | H04L 9/32 713/189 |
| 2007/0073591 A1 * | 3/2007 | Perry | G06Q 30/0641 705/26.64 |
| 2008/0033937 A1 * | 2/2008 | Cha | G06F 16/90335 707/999.005 |
| 2008/0177640 A1 * | 7/2008 | Gokturk | G06Q 30/02 705/26.62 |
| 2008/0177710 A1 * | 7/2008 | Cha | G06K 9/627 707/E17.14 |
| 2008/0212899 A1 * | 9/2008 | Gokturk | G06V 10/40 382/305 |
| 2009/0066996 A1 * | 3/2009 | Minowa | G07G 5/00 358/1.15 |
| 2009/0234712 A1 * | 9/2009 | Kolawa | G06Q 30/0631 705/26.7 |
| 2009/0299877 A1 * | 12/2009 | Vadon | G06Q 30/02 705/26.1 |
| 2010/0036839 A1 * | 2/2010 | Kamimaeda | G06F 16/00 707/E17.02 |
| 2010/0092067 A1 * | 4/2010 | Ellawand | G01N 21/41 382/209 |
| 2010/0191682 A1 * | 7/2010 | Takamatsu | G06Q 30/02 706/12 |
| 2010/0250556 A1 * | 9/2010 | Park | G06F 16/335 707/E17.071 |
| 2011/0153677 A1 * | 6/2011 | Choi | G06F 16/2264 707/E17.057 |
| 2011/0307228 A1 * | 12/2011 | Kasabov | G06Q 10/04 703/2 |
| 2011/0307318 A1 * | 12/2011 | LaPorte | G06Q 20/387 705/14.27 |
| 2012/0160911 A1 * | 6/2012 | Smith | G06Q 20/208 235/375 |
| 2012/0166298 A1 * | 6/2012 | Smith | G06Q 20/3276 235/494 |
| 2012/0316950 A1 * | 12/2012 | LaPorte | G06Q 20/3276 705/14.27 |
| 2013/0064459 A1 * | 3/2013 | Ellawand | G01N 21/87 382/218 |
| 2013/0088517 A1 * | 4/2013 | McKenna | G06F 16/444 345/635 |
| 2013/0238681 A1 * | 9/2013 | Oka | G06F 7/58 708/250 |
| 2014/0040053 A1 * | 2/2014 | Argue | G06Q 20/047 705/17 |
| 2014/0052563 A1 * | 2/2014 | Watkins | G06Q 30/0621 705/26.5 |
| 2014/0089310 A1 * | 3/2014 | Myers | G06Q 30/00 707/737 |
| 2014/0122274 A1 * | 5/2014 | Argue | G06Q 20/047 705/24 |
| 2014/0304278 A1 * | 10/2014 | Kleiman | G06F 16/583 382/305 |
| 2016/0062731 A1 * | 3/2016 | Lin | G06F 16/319 707/742 |
| 2016/0300118 A1 * | 10/2016 | Murray | G06V 10/56 |
| 2016/0335053 A1 * | 11/2016 | Kumar | G06K 9/6232 |
| 2017/0140012 A1 * | 5/2017 | Bortnikov | G06V 10/94 |
| 2017/0221127 A1 * | 8/2017 | Sandman | G06Q 30/0631 |
| 2017/0329840 A1 * | 11/2017 | McGowan | G06F 16/3323 |
| 2018/0025365 A1 * | 1/2018 | Wilkinson | G06Q 30/0201 705/7.29 |
| 2018/0053240 A1 * | 2/2018 | Jones | G06Q 30/0635 |
| 2018/0068023 A1 * | 3/2018 | Douze | G06F 16/9535 |
| 2018/0101570 A1 * | 4/2018 | Kumar | G06F 17/10 |
| 2018/0150551 A1 * | 5/2018 | Wang | G06F 16/338 |
| 2018/0217836 A1 * | 8/2018 | Johnson | G06F 9/28 |
| 2019/0057430 A1 * | 2/2019 | Zhu | G06K 9/6261 |
| 2019/0130285 A1 * | 5/2019 | Snyder | G06N 3/04 |
| 2019/0156395 A1 * | 5/2019 | Bessega | G06F 16/51 |
| 2019/0266552 A1 * | 8/2019 | Gupta | G06Q 30/0201 |
| 2019/0266656 A1 * | 8/2019 | Watkins | G06Q 30/0631 |
| 2020/0250731 A1 * | 8/2020 | Soohoo | G06N 5/022 |
| 2021/0035178 A1 * | 2/2021 | Caples | G06Q 30/0627 |

FOREIGN PATENT DOCUMENTS

| | | | | |
|---|---|---|---|---|
| CN | 105005701 A | * | 10/2015 | |
| CN | 107066485 A | * | 8/2017 | G06F 16/532 |
| EP | 2469459 A2 | * | 6/2012 | G06Q 20/32 |
| JP | 2000235669 A | | 8/2000 | |
| JP | 2004326537 A | * | 11/2004 | |
| KR | 20060099377 A | * | 9/2006 | |
| KR | 20060099377 A | * | 9/2016 | |
| KR | 102304216 B1 | * | 9/2021 | |
| WO | WO-0237748 A2 | * | 5/2002 | G06Q 20/12 |
| WO | WO-2018048853 A1 | * | 3/2018 | G06F 16/9535 |

OTHER PUBLICATIONS

P. Liu, G. Nie and D. Chen, "Exploiting Semantic Descriptions of Products and User Profiles for Recommender Systems," 2007 IEEE Symposium on Computational Intelligence and Data Mining, 2007, pp. 179-185, doi: 10.1109/CIDM.2007.368870. (Year: 2007).*

* cited by examiner

AUTOMATICALLY DETERMINING INVENTORY ITEMS THAT MEET SELECTION CRITERIA IN A HIGH-DIMENSIONALITY INVENTORY DATASET

BACKGROUND

Field of the Various Embodiments

Embodiments of the present invention relate generally to computer science and data analysis and mining technology and, more specifically, to automatically selecting inventory items that meet selection criteria in a high-dimensionality inventory dataset.

Description of the Related Art

Diamonds are characterized by a large number of physical attributes, including carat, color, clarity, weight, dimension, shape, and cut, among others. Any given diamond generally has a distinct combination of these attributes and is therefore typically unique compared to other diamonds. A given diamond that is available for purchase is typically assigned a price that is based on a market analysis of diamonds having a similar carat, color, and clarity attributes. Other attributes may also affect pricing. Additionally, a given diamond that is available for purchase also is typically assigned a grade that is based on a laboratory analysis of the given diamond relative to some or all attributes of the given diamond.

Due to the large number of physical attributes associated with diamonds, there is quite a bit of variation across diamonds at each price point and across diamonds having similar grades. For example, a first diamond having a low clarity and a high carat could have the same price and/or grade as a second diamond having a high clarity and a low carat. As a result, diamonds that are physically quite different from one another can have similar price and/or similar grade. Most consumers are unfamiliar with some or all of the above physical attributes of diamonds and/or how these physical attributes affect price and/or grade. Consequently, most consumers have difficulty selecting a diamond to purchase and are left to seek assistance from the diamond vendors themselves (or other experts, such as gemologists).

A typical diamond vendor usually has access to a large inventory of diamonds that sometimes can include several thousand diamonds. A given diamond within a typical inventory of diamonds is assigned various values corresponding to the different physical attributes of the given diamond and also is assigned other values indicating the price and grade of the given diamond. To assist a consumer in selecting and purchasing a diamond, the diamond vendor manually evaluates the inventory of diamonds, based on one or more criteria provided by the consumer, and narrows the inventory of diamonds to a manageable subset of diamonds from which the consumer can make a final selection.

One drawback of the above approach is that the diamond vendor has to manually evaluate a large inventory of diamonds having a complex mixture of attributes, grades, and prices in order to identify a smaller and more manageable subset of diamonds to show to a customer. Not only does this type of manual evaluation take an inordinate amount of time, but, because of the sheer volume of data involved, the vendor may miss good candidate diamonds to present to the customer.

As the foregoing illustrates, what is needed in the art are more effective techniques for evaluating and selecting diamonds within large inventories of diamonds.

SUMMARY

Various embodiments include a computer-implemented method for analyzing inventories to generate one or more selections of inventory items, including generating a first data vector based on one or more selection criteria, wherein the first data vector has N dimensions, and N comprises a positive integer value that represents a number of attributes associated with a given inventory item, generating a first location in an inventory space based on the first data vector, wherein the inventory space has N dimensions and represents a plurality of inventory items, determining one or more data vectors that correspond to one or more inventory items based on the first location, and outputting the one or more data vectors via a graphical user interface.

At least one technological advantage of the disclosed techniques relative to the prior art is that a large volume of complex multidimensional data can be automatically analyzed to identify diamonds that meet the selection criteria with little or no human intervention. Accordingly, a vendor or other user need not manually and painstakingly analyze a large volume of data when assisting a consumer with selecting a diamond.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
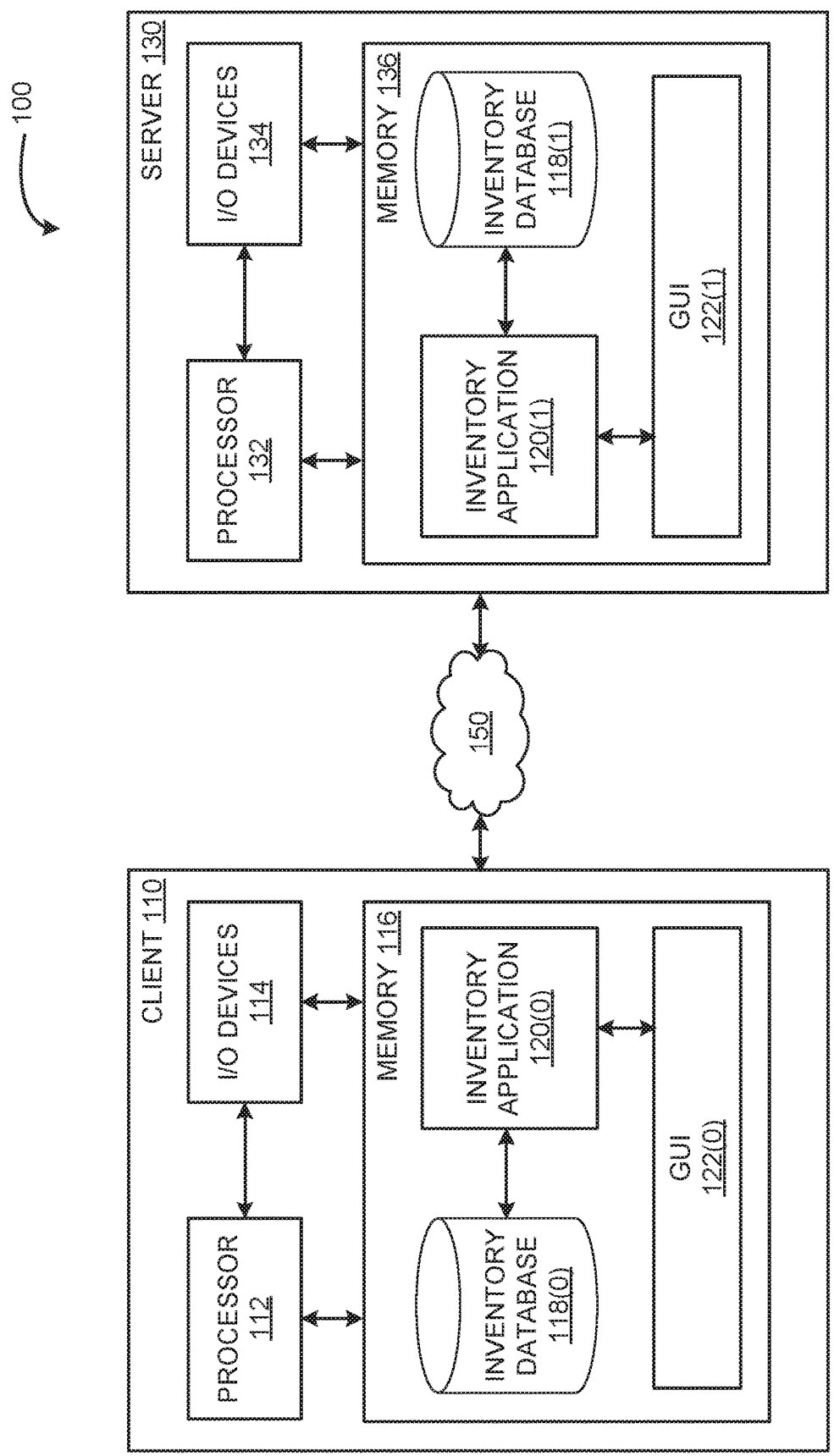
FIG. 1 illustrates a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As noted above, an inventory of diamonds is typically a large dataset that catalogues thousands of different potentially unique diamonds having many attributes. A diamond vendor is a professional who specializes in analyzing and/or evaluating diamonds and/or conducting diamond-oriented business. A diamond vendor can assist a consumer in selecting a diamond from the inventory of diamonds by manually analyzing the inventory or diamonds based on one or more selection criteria provided by the consumer. In doing so, the diamond vendor manually analyzes high-dimensionality data associated with some or all diamonds catalogued in the inventory of diamonds to identify those diamonds that potentially meet the selection criteria associated with the user.

One drawback of the above approach is that manually analyzing high-dimensionality data can be a complex and time-consuming process. Another drawback of the above approach is that inventories of diamonds sometimes catalogue thousands of different diamonds and therefore include a large volume of data that has to be analyzed by the diamond vendor, further complicating the process of narrowing down the inventory of diamonds to a manageable size.

To address these issues, various embodiments include an inventory application that automatically explores a high-dimensionality inventory dataset associated with an inventory of diamonds to identify one or more diamonds that meet one or more selection criteria associated with a user. The user could be a consumer, a diamond vendor, or any other individual or entity that uses the inventory application, including other software applications. The inventory application determines a user profile based on interactions with the user. The user profile reflects the selection criteria and various metadata associated with the user. The inventory application then maps the user profile to one or more templates and/or generates one or more templates. A given template is an abstract representation of a diamond that meets the selection criteria to some degree. The inventory application projects the one or more templates to one or more corresponding locations in an inventory space. The inventory space is an N-dimensional space representing all diamonds included in the inventory of diamonds, N being a positive integer equal to a number of attributes associated with any given diamond included in the inventory of diamonds. A given attribute can include physical attributes such as carat, clarity, and/or color, or other attributes such as price and/or grade. The inventory application identifies one or more diamonds within the inventory space that reside proximate to each location associated with the one or more templates and returns data associated with these diamonds to the user.

The disclosed inventory application can be configured to identify diamonds within a potentially vast inventory of diamonds according to a number of different usage scenarios. In one embodiment, the disclosed inventory application may identify a specific number of diamonds within the inventory of diamonds that have similar physical attributes but different prices and/or grades. In another embodiment, the disclosed inventory application may identify one or more diamonds within the inventory of diamonds based on data describing an unpriced diamond. The inventory application may then set a price for the unpriced diamond based on pricing information associated with the identified diamonds. In yet another embodiment, the disclosed inventory application may identify a set of diamonds that share a common set of physical attributes and can therefore be included together in a given set of jewelry, such as a set of earrings. In some instances, one diamond in the set of diamonds may already be identified, and the disclosed inventory application identifies a matching diamond.

At least one technological advantage of the disclosed techniques relative to the prior art is that a large volume of complex multidimensional data can be automatically analyzed to identify diamonds that meet the selection criteria with little or no human intervention. Accordingly, a vendor or other user need not manually and painstakingly analyze a large volume of data when assisting a consumer with selecting a diamond. Further, the disclosed techniques help ensure that diamond inventories are analyzed fully when identifying diamonds for customers, which reduces the likelihood that good candidate diamonds are missed. These technological advantages represent one or more technological advancements over prior art approaches.

System Overview

FIG. 1 illustrates a system configured to implement one or more aspects of the various embodiments. As shown, a system 100 includes a client 110 and a server 130 coupled together via a network 150. Client 110 or server 130 may be any technically feasible type of computer system, including a desktop computer, a laptop computer, a mobile device, a virtualized instance of a computing device, a distributed and/or cloud-based computer system, and so forth. Network 150 may be any technically feasible set of interconnected communication links, including a local area network (LAN), wide area network (WAN), the World Wide Web, or the Internet, among others.

As further shown, client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes an inventory database 118(0), an inventory application 120(0), and a graphical user interface (GUI) 122(0). Inventory database 118(0) stores various data that is processed by inventory application 120(0). Inventory application 120(0) is a software application that, when executed by processor 112, interoperates with a corresponding software application executing on server 130. GUI 122(0) is an interface through which inventory application 120(0) can receive input and provide output.

Server 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform input and/or output operations, such as a display device, a keyboard, or a touchscreen, among others.

Memory 136 includes any technically feasible storage media configured to store data and software applications, such as, for example, a hard disk, a RAM module, and a ROM. Memory 136 includes an inventory database 118(1), an inventory application 120(1), and a GUI 122(1). Inventory database 118(1) stores various data that is processed by inventory application 120(1). Inventory application 120(1) is a software application that, when executed by processor 112, interoperates with inventory application 120(1) executing on client 110. GUI 122(1) is an interface through which inventory application 120(1) can receive input and provide output.

As a general matter, inventory databases 118(0) and 118(1) represent separate portions of a distributed storage entity. Thus, for simplicity, inventory databases 118(0) and 118(1) are collectively referred to hereinafter as inventory database 118. Similarly, inventory application 120(0) and inventory application 120(1) represent separate portions of a distributed software entity that is configured to perform any and all of the inventive operations described herein. Thus, for simplicity, inventory applications 120(0) and 120(1) are collectively referred to hereinafter as inventory application 120. GUIs 122(0) and 122(1) likewise represent separate portions of a distributed GUI that is referred to collectively hereinafter as GUI 122.

In operation, inventory database 118 stores a set of N-dimensional data vectors that define N attributes of a set of diamonds, N being a positive integer. Inventory application 120 is configured to analyze the data vectors stored in inventory database 118 and generate an N-dimensional inventory space to represent the corresponding set of diamonds. Inventory application 120 can then explore that inventory space, based on input received from a user, in order to identify one or more diamonds within the set of diamonds that meet one or more selection criteria associated with the user. Inventory application 120 is described in greater detail below in conjunction with FIGS. 2A-4.

Software Overview

Figure 2A:
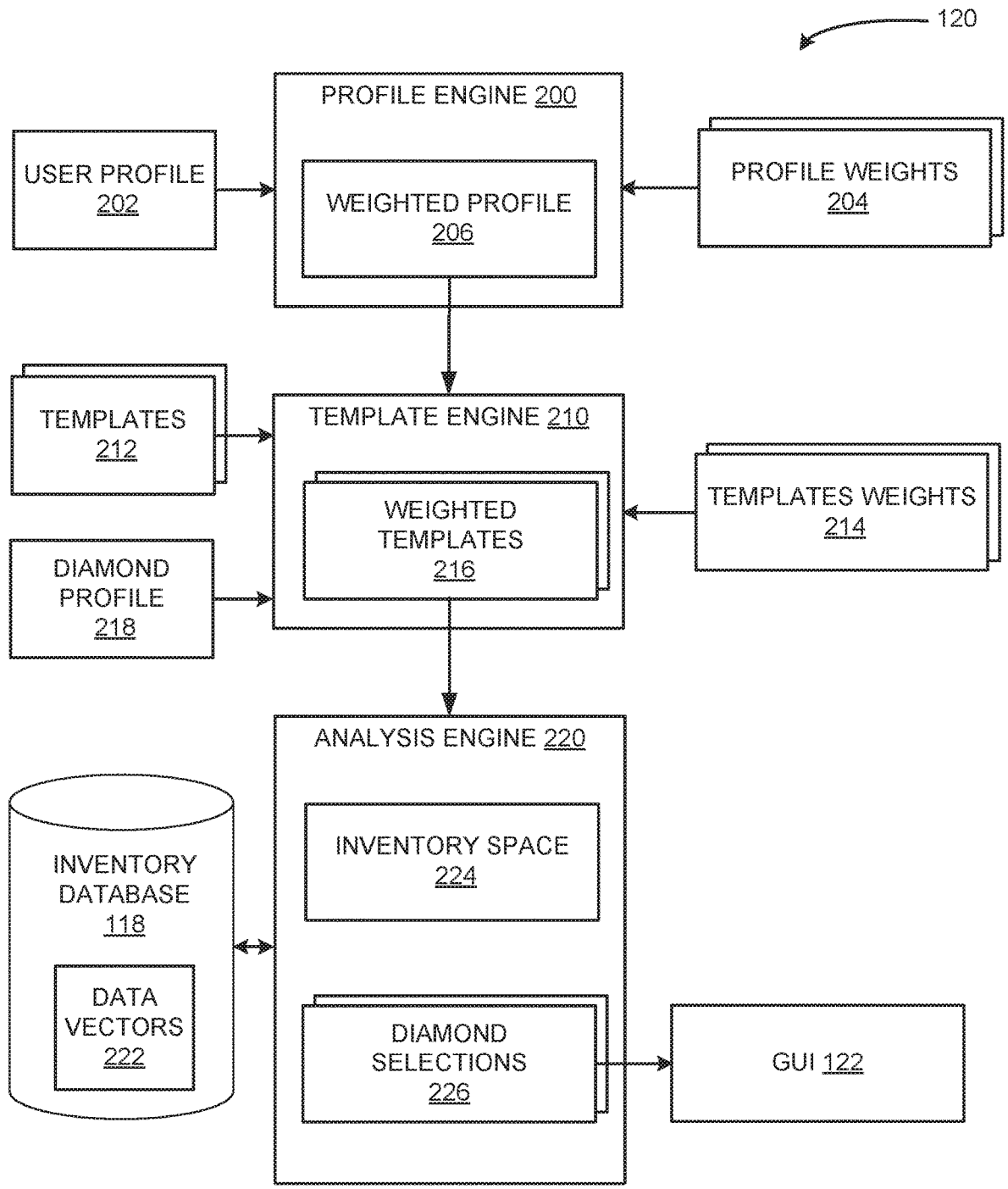
FIG. 2A is a more detailed illustration of the inventory application of FIG. 1, according to various embodiments.

FIG. 2A is a more detailed illustration of the inventory application of FIG. 1, according to various embodiments. As shown, inventory application 120 includes a profile engine 200, a template engine 210, and an analysis engine 220.

In operation, profile engine 200 interacts with a user to obtain or generate a user profile 202. The user could be, for example, a consumer who is working with a diamond vendor to select and purchase one or more diamonds. Alternatively, the user could be a diamond vendor who is independently selecting and purchasing one or more diamonds for various reasons. User profile 202 can include target values for different attributes associated with diamonds, including a target carat, clarity, color, price, grade, and so forth. Additionally, user profile 202 can indicate specific constraints associated with diamonds, such as the specific types of jewelry where a given diamond can be mounted, among others. User profile 202 can also include various metadata associated with the user, such as a purchase history associated with the user, socioeconomic data associated with the user, location information associated with the user, a number of diamonds the user desires to locate, configuration settings for configuring the operation of inventory application 120, and so forth. In one embodiment, user profile 202 may be vector of data values that represent specific preferences of the user relative to different diamond attributes.

Profile engine 200 combines user profile 202 with profile weights 204 to generate weighted profile 206. Profile weights 204 include various weightings that can be applied to weight different portions of user profile 202. For example, profile weights 204 could weight a shape attribute indicated in user profile 202 with a first weight and weight a carat attribute indicated in user profile 202 with a second weight. Profile weights 204 can be manually generated and fine-tuned to favor specific portions of user profile 202. Profile weights 204 can also be dynamically modified via a Machine Learning process that is described in greater detail below in conjunction with FIG. 2B. In one embodiment, profile engine 200 may multiply a data vector included in user profile 202 by profile weights 204 to generate weighted profile 206. In so doing, profile engine 200 may scale user profile 202 from a lower dimensionality to a higher dimensionality. Profile engine 200 supplies weighted profile 206 to template engine 210.

Template engine 210 analyzes weighted profile 206 and maps weighted profile 206 to one or more templates 212. Each template 212 is an abstract representation of a generic diamond and includes an N-dimensional data vector that defines values for various attributes associated with diamonds, including carat, clarity, color, weight, dimension, cut, shape, and so forth. Some templates 212 may define abstract representations of diamonds that are the same or similar to one another. A given template 212 can be curated by a human expert or generated via a machine learning process, among other possibilities. In one embodiment, template engine 210 may map weighted profile to one or more of templates 212 by comparing weighted profile 206 to templates 212 and selecting one or more templates 212 that are most similar to weighted profile 206. In another embodiment, template engine 210 may generate one or more templates 212 based on weighted profile 206. As a general matter, templates 212 can be obtained, selected, and/or generated via any technically feasible operation of template engine 210.

Template engine 210 combines the one or more templates 212 with template weights 214 to generate weighted templates 216. Template weights 214 include various weightings that can be applied to weight different portions of each template 212. For example, template weights 214 could weight a cut attribute indicated in each template 212 with one weight and weight a dimension attribute indicated in each template 212 with another weight. Template weights 214 can be manually generated and fine-tuned to favor specific portions of templates 212, in like fashion as described above relative to profile weights 204. Template weights 214 can likewise be modified via a Machine Learning process that is described in greater detail below in conjunction with FIG. 2B. In one embodiment, template engine 210 may multiply each of the one or more templates 212 by template weights 214 to generate weighted templates 216. Template engine 210 supplies weighted templates 216 to analysis engine 220.

In some configurations of inventory application 120, template engine 210 obtains a diamond profile 218 that represents a real-world diamond to which the user wishes to locate a matching diamond for various reasons. For example, the user could have an unpriced diamond in possession and wish to identify one or more similar diamonds that have already been priced. Based on the one or more similar diamonds, inventory application 120 can provide a price for the unpriced diamond. Alternatively, the user could have already selected one diamond, but wish to select one or more similar diamonds in order to commission the manufacture of jewelry that includes a set of similar diamonds, such as a pair of earrings. In such configurations, template engine 210 combines diamond profile 218 with template weights 214 to generate weighted templates 216 and supplies weighted templates 216 to analysis engine 220.

In one embodiment, diamond profile 218 may indicate one or more constraints associated with a given diamond based on which one or more other diamonds should be selected. For example, a given constraint could indicate the specific types of jewelry where the given diamond can be mounted, and would therefore indicate that other selected diamonds should similarly meet that constraint. In another embodiment, diamond profile 218 may describe a lab-grown diamond that is to be matched to a natural or non-lab grown diamond or describe a natural or non-lab grown diamond that is to be matched to a lab-grown diamond.

Analysis engine 220 is configured to analyze data vectors 222 stored in inventory database 118 to generate inventory space 224. Each data vector 222 is an N-dimensional data set that describes N attributes associated with a particular diamond, including physical attributes such as dimension, weight, shape, and cut, as well as other attributes such as grade and/or price, among other metadata. A given data vector 222 generally corresponds to a real-world diamond. Inventory space 224 is an N-dimensional space that represents those data vectors. Each data vector 222 resides at a unique location within inventory space 224. Data vectors 222 that reside proximate to one another generally correspond to similar diamonds, while data vectors 222 that reside distant from one another generally correspond to dissimilar diamonds. Inventory space 224 can be explored, via analysis engine 220, to identify one or more diamonds that meet the selection criteria associated with the user.

In one embodiment, analysis engine 220 may explore inventory space 224 by projecting weighted templates 216 to various locations in inventory space 224. For a given location associated with a weighted template 216, analysis engine 220 then identifies one or more data vectors 222 that reside proximate to the given location. The identified data vectors 222 may meet the selection criteria associated with the user but have different prices. The identified data vectors 222 are returned to the user via GUI 122 as diamond selections 226. This particular embodiment is described by way of example below in conjunction with FIG. 3A.

In another embodiment, analysis engine 220 may explore inventory space 224 by projecting a weighted template 216 that is derived from a diamond profile 218 to a location in inventory space 224. Analysis engine 220 may then identify a data vector 222 that resides proximate to the given location and return that data vector 222 to the user as a diamond selection 226. Based on the identified data vector, analysis engine 220 may set a price for a diamond that is defined by diamond profile 218. This particular embodiment is described by way of example below in conjunction with FIG. 3B.

In yet another embodiment, analysis engine 220 may explore inventory space 224 by projecting a weighted template 216 to various locations in inventory space 224 and then identifying, for a given location, two or more data vectors 222 that reside proximate to the given location but more proximate to one another. Analysis engine 220 returns these two or more data vectors 222 to the user as diamond selections 226. This particular embodiment may be implemented to identify diamonds that closely match one another. This particular embodiment is described by way of example below in conjunction with FIG. 3C.

In any of the above embodiments, analysis engine 220 provides diamond selections 226 to the user via GUI 122, and GUI 122 may then receive user input indicating whether diamond selections 226 meet the selection criteria. A training engine within inventory application 120 can then process this user input to modify profile weights 204 and/or template weights 214 to improve the accuracy with which analysis engine 220 generates diamond selections 226, as described below in greater detail in conjunction with FIG. 2B.

Figure 2B:
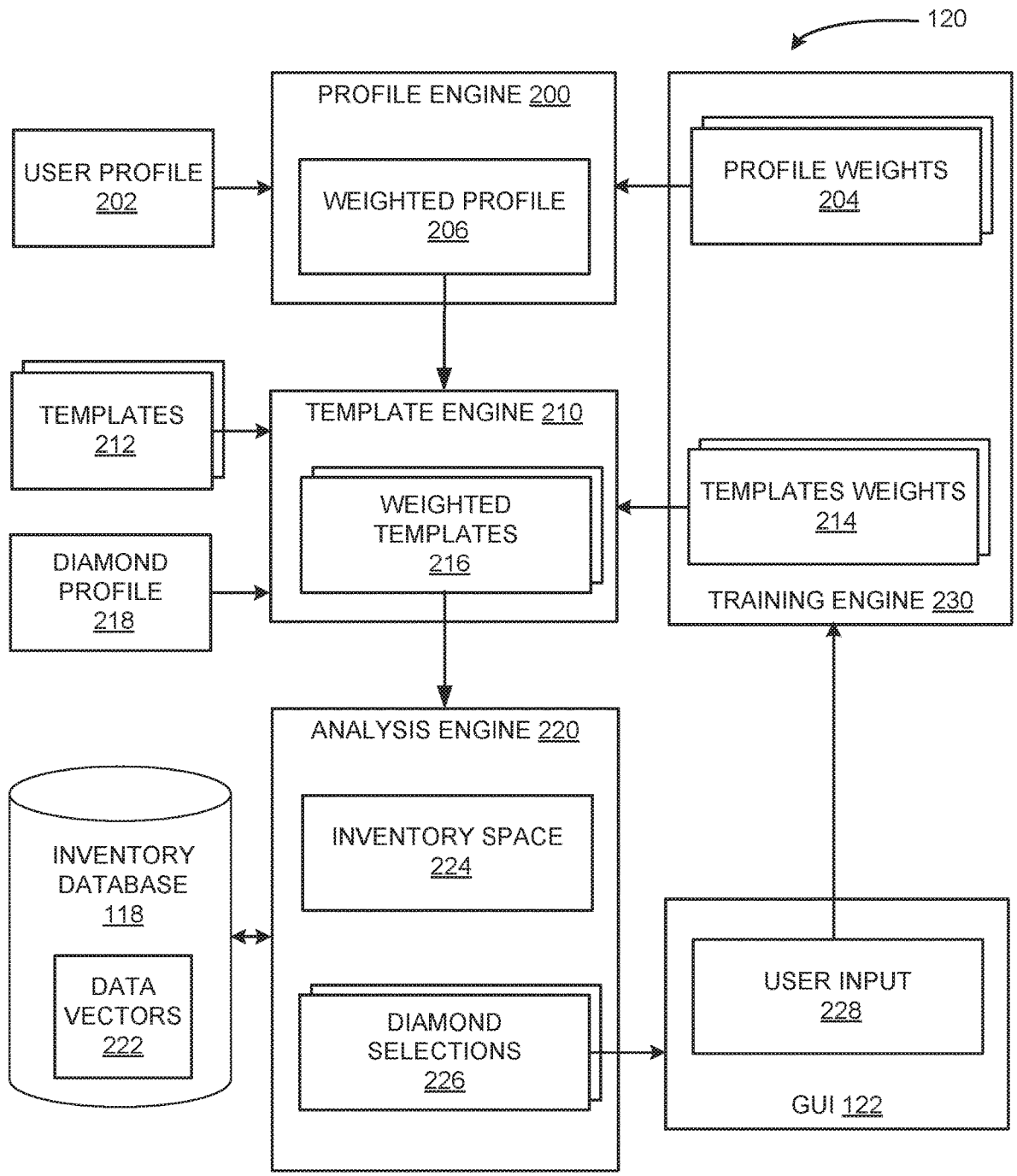
FIG. 2B illustrates a training engine that can be included in the inventory application of FIG. 2A, according to various embodiments.

FIG. 2B illustrates a training engine that can be included in the inventory application of FIG. 2A, according to various embodiments. As shown, inventory application 120 further includes a training engine 230. GUI 122 receives user input 228 indicating whether diamond selections 226 meet the selection criteria and provides user input 228 to training engine 230. Training engine 230 is configured to implement a Machine Learning process in order to modify profile weights 204 and/or template weights 214 based on user input 228. In so doing, training engine 230 can increase the accuracy with which analysis engine 220 generates diamond selections 226 that meet the selection criteria associated with the user.

For example, suppose user input 228 indicates that diamond selections 226 do, in fact, meet the selection criteria associated with the user. Training engine 230 could then reinforce profile weights 204 that contribute to diamond selections 226 and diminish profile weights 204 that do not contribute to diamond selections 226. In this manner, training engine 230 can strengthen weights corresponding to more relevant portions of user profile 202 and weaken weights corresponding to less relevant portions of user profile 202. Modifying profile weights 204 in this fashion could, for example, reflect the importance of price versus desired grade. Subsequently, when profile engine 200 generates weighted profile 206 based on user profile 202 and profile weights 204, weighted profile 206 is more strongly biased towards the more relevant portions user profile 202 and less strongly biased towards the less relevant portions of user profile 202. Persons skilled in the art will understand how any technically feasible Machine Learning process can be applied to modify profile weights 204.

Training engine 230 can perform a similar process with regard to template weights 214. For example, suppose user input 228 indicates that diamond selections 226 meet the selection criteria associated with the user. Training engine 230 could then reinforce template weights 214 that contribute to diamond selections 226 and diminish template weights 214 that do not contribute to diamond selections 226. In this manner, training engine 230 can strengthen weights corresponding to more relevant portions of templates 212 and weaken weights corresponding to less relevant portions of templates 212. Modifying template weights 214 in this fashion could, for example, reflect the importance of clarity versus cut. Subsequently, when profile engine 200 generates weighted template 216 based on templates 212 and template weights 214, weighted templates 216 are more strongly biased towards the more relevant portions templates 212 and less strongly biased towards the less relevant portions of templates 212. As above, persons skilled in the art will understand how any technically feasible Machine Learning process can be applied to modify template weights 214.

Training engine 230 can be configured to implement a Machine Learning process that occurs in any number of different phases. For example, during an initial training phase, training engine 230 could randomly increment and/or decrement various weights included in profile weights 204 and/or template weights 214 to establish a set of gradients associated with each weight. A given gradient could indicate how changing the corresponding weight affects user input 228 over time. During a subsequent training phase, training engine 230 could increment and/or decrement various weights included in profile weights 204 and/or template weights 214 based on the corresponding gradients in an effort to improve how often user input 228 indicates that diamond selections 226 meet the selection criteria. Training engine 230 could repeat these phases iteratively until the accuracy with which diamond selections 228 are generated converges to some accuracy criteria. In various embodiments, training engine 230 may modify profile weights 204 and/or template weights 214 based on a curated set of training data. As a general matter, any of the data vectors described herein can be weighted or otherwise modified via matrix multiplication with one or more sets of weights. For example, the N-dimensional data vectors 222 described above could be generated via matrix multiplication with one or more weight matrices.

Referring generally to FIGS. 2A-2B, the techniques described above can be implemented in conjunction with any of the usage scenarios described thus far. In particular, in one embodiment, inventory application 120 may identify a specific number of diamonds within the inventory of diamonds that have similar physical attributes but different prices based on templates 212 that have similar attributes but different prices. This embodiment is described by way of example below in conjunction with FIG. 3A.

In another embodiment, inventory application 120 may identify one or more diamonds within the inventory of diamonds based on data describing an unpriced diamond. The inventory application may then set a price for the unpriced diamond based on pricing information associated with the identified diamonds. This embodiment is described by way of example below in conjunction with FIG. 3B.

In yet another embodiment, inventory application 120 may identify a set of diamonds that share a common set of physical attributes and can therefore be included together in a given set of jewelry. This embodiment is described by way of example below in conjunction with FIG. 3C.

Exploring an Inventory Space to Select Diamonds

Figure 3A:
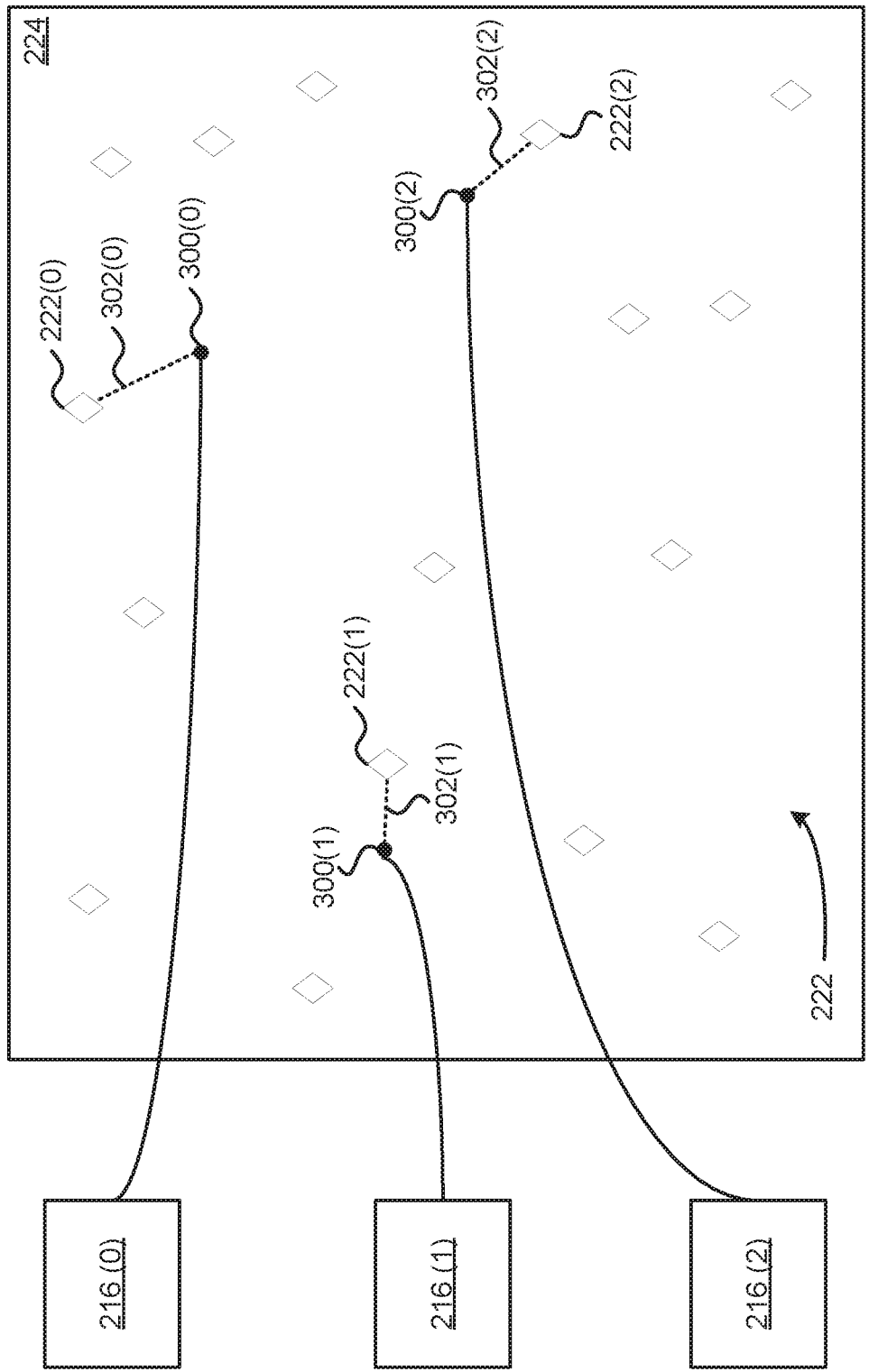
FIG. 3A illustrates how the inventory application of FIG. 1 selects one or more diamonds by analyzing an N-dimensional inventory space, according to various embodiments.

FIG. 3A illustrates how the inventory application of FIG. 1 selects one or more diamonds by analyzing an N-dimensional inventory space, according to various embodiments. As shown, inventory space 224 includes a plurality of data vectors 222, where each data vector 222 corresponds to a different diamond. Inventory space 224 is an N-dimensional space where N is equal to the number of attributes defined in each data vector 222. Data vectors 222 that reside close to one another in inventory space 222 are generally similar to one another, whereas data vectors 222 that reside distant from one another in inventory space 222 are generally different from one another.

Inventory application 120 is configured to identify one or more diamonds that meet selection criteria associated with the user by performing a sequence of operations to explore inventory space 224. In particular, inventory application 120 generates weighted templates 216(0), 216(1), and 216(2) in the manner described above in conjunction with FIGS. 2A-2B and then projects these weighted templates 216 to locations 300(0), 300(1), and 300(2), respectively. In one embodiment, inventory application 120 may map each element of a given weighted template 216 to a different coordinate in inventory space 224 to generate a location for that weighted template 216. For each location 300, inventory application 120 determines the nearest neighboring data vector 222.

In the example shown, inventory application 120 determines that data vector 222(0) is the nearest neighbor of location 300(0), residing a distance 302(0) from location 300(0). Inventory application 120 also determines that data vector 222(1) is the nearest neighbor of location 300(1), residing a distance 302(1) from location 300(1), and that data vector 222(2) is the nearest neighbor of location 300(2), residing a distance 302(2) from location 300(2). Upon identifying data vectors 222(0), 222(1), and 222(2), inventory application 120 updates GUI 122 to output various data defined in these data vectors to the user. In this manner, inventory application 120 can identify diamonds that meet the selection criteria associated with the user. The above technique can also be applied to identify one or more diamonds that match one or more existing diamonds in order to create a set of matching diamonds to be included together in one or more pieces of jewelry. Inventory application 120 performs an analogous technique to that described above in order to generate a price for an unpriced diamond or, in some cases, repricing a diamond with outdated pricing, as described in greater detail below in conjunction with FIG. 3B.

Figure 3B:
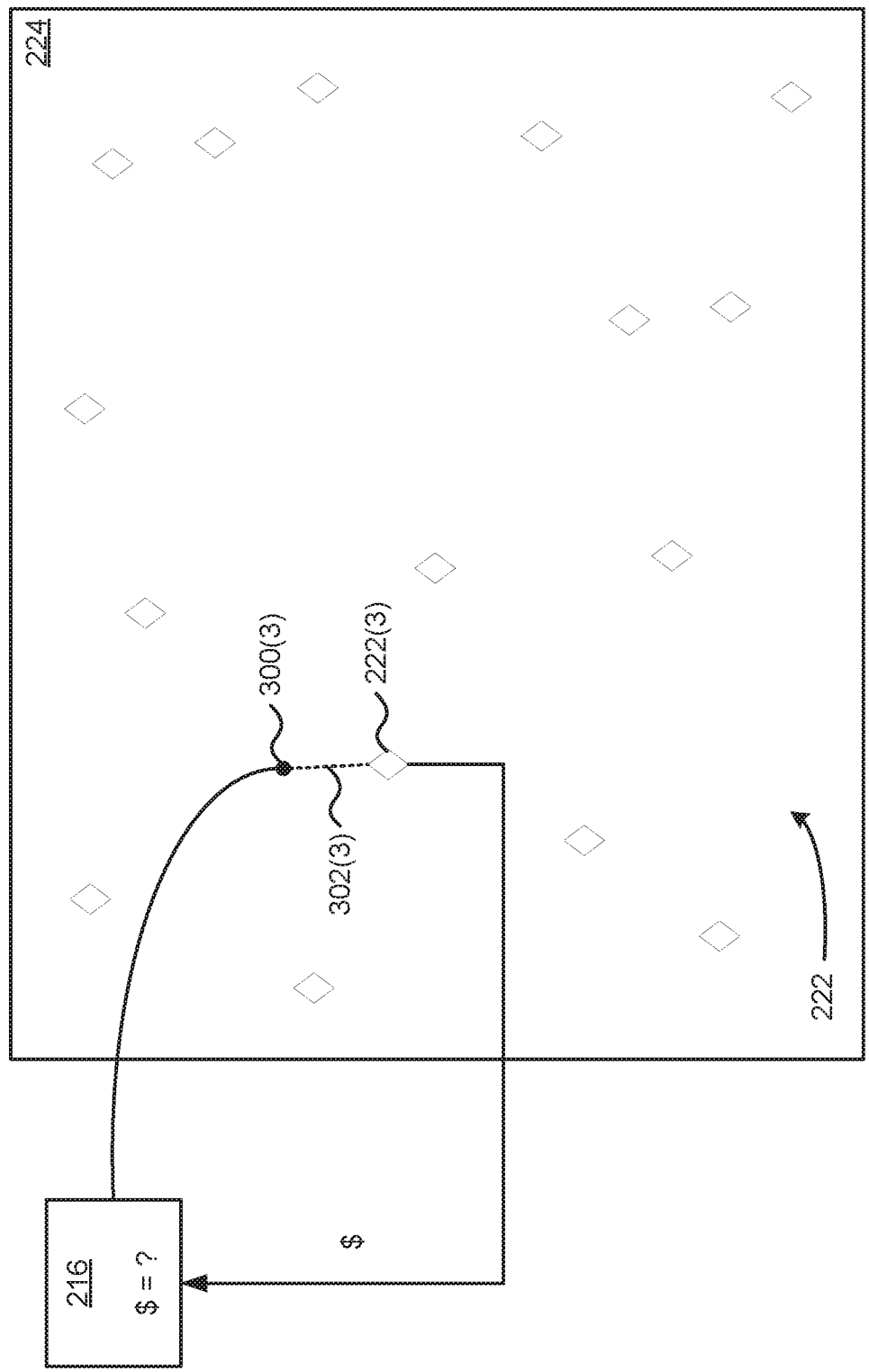
FIG. 3B illustrates how the inventory application of FIG. 1 determines a price for an unpriced diamond by analyzing an N-dimensional inventory space, according to various embodiments.

FIG. 3B illustrates how the inventory application of FIG. 1 determines a price for a diamond by analyzing an N-dimensional inventory space, according to various embodiments. As shown, inventory application 120 generates weighted template 216 and then projects weighted template 216 to a location 300(3) within inventory space. Weighted template 216 can be generated based on diamond profile 218 in the manner described above in conjunction with FIG. 2A where diamond profile 218 corresponds to a diamond that needs to be priced or re-priced. Inventory application 120 determines that data vector 222(3) is the nearest neighbor of location 300(3), residing at a distance 302(3) from location 300(3). Inventory application 120 then extracts a price from data vector 222(3) associated with the corresponding diamond and returns the price to the user via GUI 122. With this approach, inventory application 120 generates a price for a diamond that needs pricing or re-pricing based on a pre-existing price associated with a similar diamond. In one embodiment, inventory application 120 may select a set of data vectors 222 residing nearby location 300(3) and then perform a filtering operation to identify one data vector 222 within that set or compute a function based on some or all data vectors 222 in that set. Inventory application 120 can also identify matching sets of diamonds via the techniques described below in conjunction with FIG. 3C.

Figure 3C:
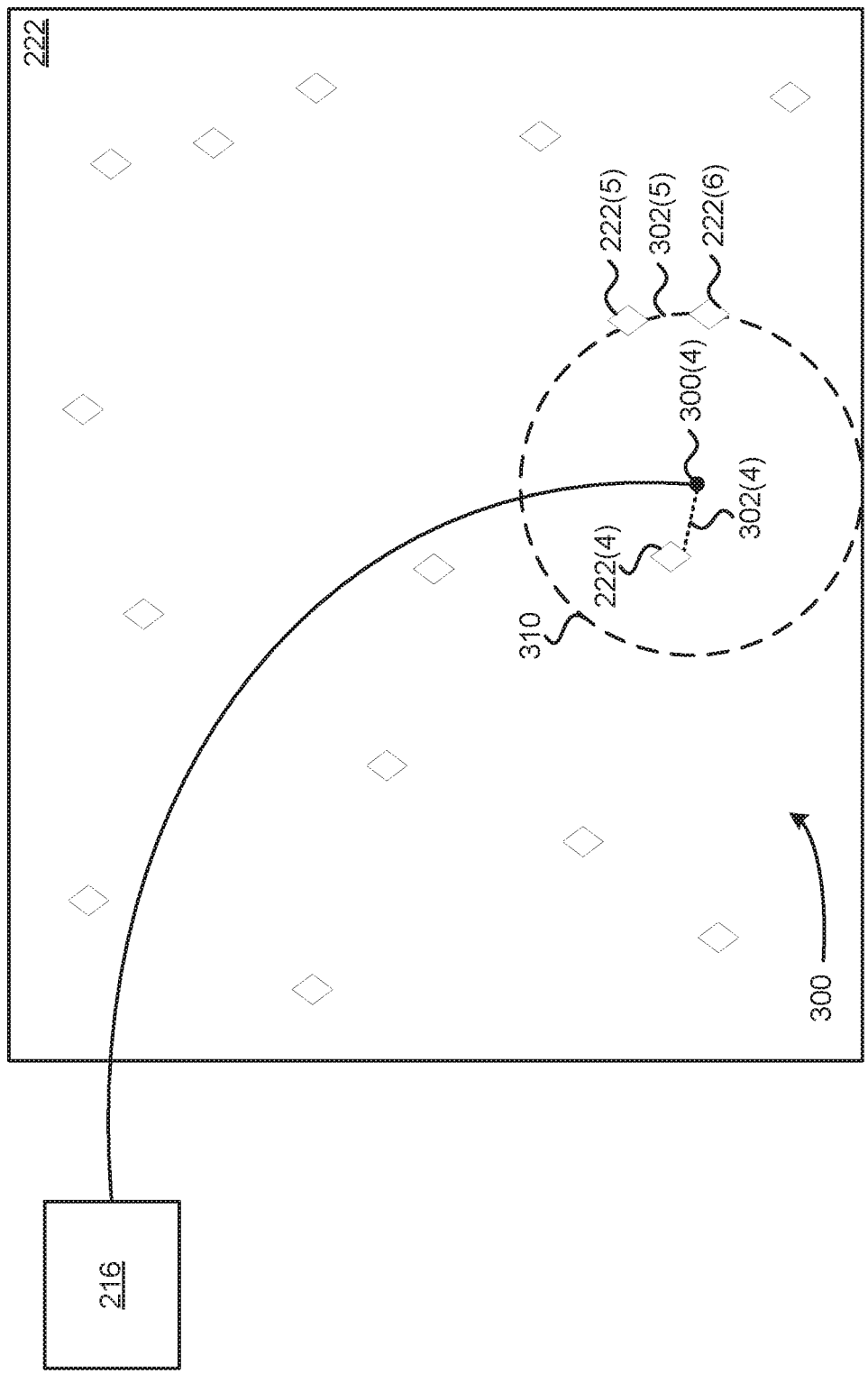
FIG. 3C illustrates how the inventory application of FIG. 1 determines a pair of matching diamonds by analyzing an N-dimensional inventory space, according to various embodiments.

FIG. 3C illustrates how the inventory application of FIG. 1 determines a pair of matching diamonds by analyzing an N-dimensional inventory space, according to various embodiments. As shown, inventory application 120 generates weighted template 216 in the manner described above in conjunction with FIG. 2A and then projects weighted template 216 to a location 300(4) within inventory space. Inventory application 120 determines that data vector 222(4) is the nearest neighbor of location 300(4), residing at a distance 302(4) from location 300(4). However, inventory application 120 needs to locate a matching set of two or more diamonds and no other data vectors 222 are positioned nearby data vector 222(4).

To address this type of situation, inventory application 120 collects a given number of data vectors 222 or all data vectors 222 within a given region 310 and then identifies a cluster of data vectors with minimal distance from one another. In the example shown, inventory application 120 identifies data vectors 222(5) and 222(6) that reside a distance 302(5) from one another. These two data vectors may correspond to two diamonds that are sufficiently similar to one another to be included together in jewelry, such as a set of earrings, or could also correspond to a natural diamond and a lab-grown diamond that are nearly identical. In one embodiment, inventory application 120 may collect the four closest data vectors 222 to location 300(4), and then return the two closest data vectors 222 to one another, from within those four closest data vectors 222, to the user via GUI 122.

Referring generally to FIGS. 3A-3C, in various embodiments, inventory application 120 may determine the nearest neighboring data vector 222 to any given location 300 by computing the N-dimensional Euclidean distance between each weighted template 216 and each data vector 222 included in inventory database 118 and then determining the data vector with minimum distance from the given location 300. In this embodiment, inventory application 120 need not explicitly generate inventory space 224. In various embodiments, any computed value, including distance values, can be modified based on user input.

Procedure for Exploring an Inventory Space

Figure 4:
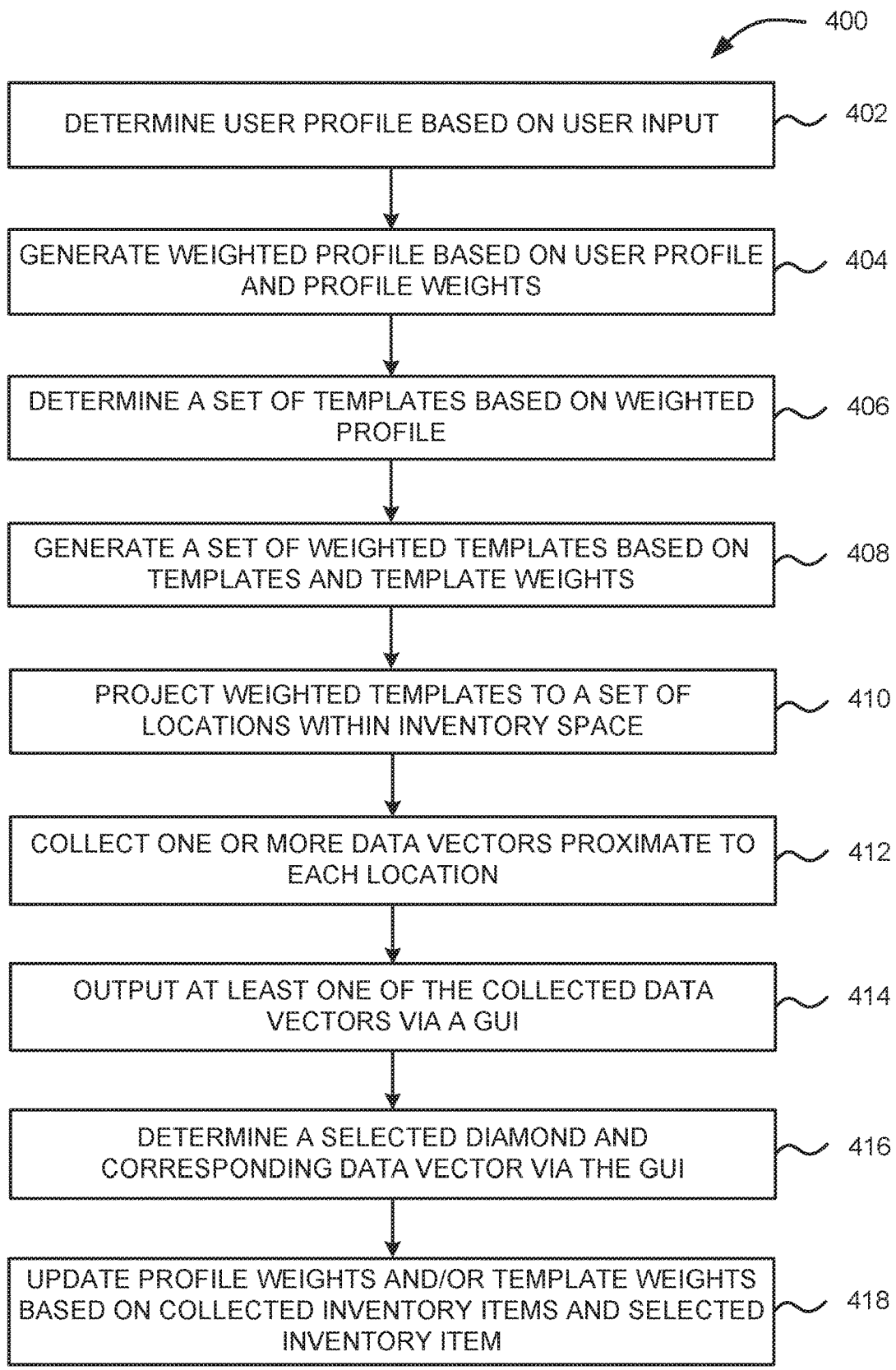
FIG. 4 is a flow diagram of method steps for analyzing an N-dimensional inventory space to select, price, and/or match one or more diamonds, according to various embodiments.

FIG. 4 is a flow diagram of method steps for analyzing an N-dimensional inventory space to select, price, and/or match one or more diamonds, according to various embodiments. Although the method steps are described in conjunction with the systems of FIGS. 1-3C, persons skilled in the art will understand that any system configured to perform the method steps in any order falls within the scope of the present embodiments.

As shown, a method 400 begins at step 402, where inventory application 120 of FIG. 1 determines user profile 202 based on user input. Inventory application 120 can obtain user profile 202 from the user or generate user profile 202 based on data or metadata associated with the user, including a browsing history, purchase history, and so forth. User profile 202 generally includes target values for various attributes associated with diamonds, including a target carat, clarity, color, price, grade, and so forth.

At step 404, profile engine 200 within inventory application 120 generates weighted profile 206 based on user profile 202 and profile weights 204. In doing so, inventory application 120 combines user profile 202 with profile weights 204 to generate weighted profile 206. Profile weights 204 include various weightings that can be applied to weight different portions of user profile 202. For example, profile weights 204 could weight a shape attribute indicated in user profile 202 with a first weight and weight a carat attribute indicated in user profile 202 with a second weight. In another example, profile weights 204 could weight a specific price range that is determined based on metadata associated with the user and that indicates the socioeconomic status of the user. Profile weights 204 can be manually or automatically generated and fine-tuned to favor specific portions of user profile 202.

At step 406, template engine 210 within inventory application 120 generates and/or determines a set of templates based on weighted profile 206. In particular, template engine 210 analyzes weighted profile 206 and maps weighted profile 206 to one or more templates 212. Each template 212 is an abstract representation of a generic diamond and includes an N-dimensional data vector that defines values for various attributes associated with diamonds, including carat, clarity, color, weight, dimension, cut, shape, and so forth. In one embodiment, weighted profile 206 may have similar dimensionality as templates 212, and template engine 210 may map weighted profile to one or more of templates 212 by comparing weighted profile 206 to templates 212 and selecting one or more templates 212 that are most similar to weighted profile 206.

At step 408, template engine 210 within inventory application 120 generates a set of weighted templates 216 based on templates 212 and template weights 214. Template weights 214 include various weightings that can be applied to weight different portions of each template 212. For example, template weights 214 could weight a "cut" attribute indicated in each template 212 with one weight and weight a "shape" attribute indicated in each template 212 with another weight. Template weights 214 can be manually-generated and fine-tuned to favor specific portions of templates 212, in like fashion as described above relative to profile weights 204

At step 410, analysis engine 220 within inventory application 120 projects weighted templates 216 to a set of locations within inventory space 224. Inventory space 224 reflects an inventory of diamonds and can be generated based on data vectors 222 included in inventory database 122. In some embodiments, inventory space 224 need not be explicitly generated in order to support the operations described herein and those operations can occur directly with data vectors 222. Inventory application 120 projects weighted templates 216 into inventory space 224 via any of the techniques described above in conjunction with FIGS. 3A-3C.

At step 412, inventory application 120 collects one or more data vectors 222 proximate to each location within inventory space 224. In usage scenarios where inventory application 120 assists the user with selecting a diamond at different price points, inventory application 120 can implement the techniques described above in conjunction with FIG. 3A to collect the one or more data vectors 222. In usage scenarios where inventory application 120 assists the user with pricing a diamond, inventory application 120 can implement the techniques described above in conjunction with FIG. 3B to collect the one or more data vectors 222. In usage scenarios where inventory application 120 assists the user with selecting a matching set of diamonds, inventory application 120 can implement the techniques described above in conjunction with FIG. 3C to collect the one or more data vectors 222. The collected data vectors 222 generally correspond to diamond selections 226 of FIGS. 2A-2B.

At step 414, inventory application 120 outputs at least one of the collected data vectors 222 via GUI 122 to the user. In so doing, inventory application 120 can reformat the data included in each data vector 222 into a common data format associated with diamond-oriented information. In one embodiment, GUI 122 is rendered within a web page that is displayed via client 110 of FIG. 1.

At step 416, inventory application 120 determines a selected diamond and corresponding data vector based on user interactions with GUI 122. In some situations, the selected diamond corresponds to one of the data vectors 222 collected at step 418. In other situations, the selected diamond does not correspond to any of the data vectors 222 collected at step 418 and corresponds to a different data vector 222. In either situation, inventory application 120 gathers user input 228 that reflects the selected diamond and supplies user input 228 to training engine 230 of FIG. 2B reflecting the selected diamond and corresponding data vector. Inventory application 120 may also provide metadata associated with the user to training engine 230 that is subsequently used for training purposes.

At step 418, training engine 230 within inventory application 120 updates profile weights 204 and/or template weights 214 based on the data vectors 222 collected at step 414 and the diamond selected at step 416 and represented in user input 228. Training engine 120 performs a Machine Learning process to modify profile weights 204 and/or template weights 214 in order increase the accuracy with which inventory application 120 selects diamonds that meet selection criteria associated with the user. In one embodiment, training engine 230 may modify profile weights 204 and/or template weights 214 based on a curated set of training data, metadata associated with the user, or any other available data. In the manner described, inventory application automatically analyzes a large volume of high dimensionality data to locate diamonds that meet selection criteria, thereby easing the burden of manually analyzing that data from the user.

Referring generally to FIGS. 1-4, persons skilled in the art will recognize that the techniques described herein can be applied to select any technically feasible type of inventory item based on a set of attributes, including diamonds, other types of precious stones, and any other type of object.

In sum, an inventory application automatically explores a high-dimensionality inventory dataset associated with an inventory of diamonds to identify one or more diamonds that meet one or more selection criteria associated with a user. The inventory application determines a user profile based on interactions with the user. The user profile reflects the selection criteria and various metadata associated with the user. The inventory application then maps the user profile to one or more templates. A given template is an abstract representation of a diamond that meets the selection criteria to some degree. The inventory application projects the one or more templates to one or more corresponding locations in an inventory space. The inventory space is an N-dimensional space representing all diamonds included in the inventory of diamonds, N being a positive integer equal to a number of attributes associated with any given diamond included in the inventory of diamonds. A given attribute can include physical attributes such as carat, clarity, and/or color, or other attributes such as price and/or grade. The inventory application identifies one or more diamonds within the inventory space that reside proximate to each location associated with the one or more templates and returns data associated with these diamonds to the user.

At least one technological advantage of the disclosed techniques relative to the prior art is that a large volume of complex multidimensional data can be automatically analyzed to identify diamonds that meet the selection criteria with little or no human intervention. Accordingly, a vendor or other user need not manually and painstakingly analyze a large volume of data when assisting a consumer with selecting a diamond. Further, the disclosed techniques help ensure that diamond inventories are analyzed fully when identifying diamonds for customers, which reduces the likelihood that good candidate diamonds are missed. These technological advantages represent one or more technological advancements over prior art approaches.

1. Some embodiments include a computer-implemented method for analyzing inventories to generate one or more selections of inventory items, the method comprising generating a first data vector based on one or more selection criteria, wherein the first data vector has N dimensions, and N comprises a positive integer value that represents a number of attributes associated with a given inventory item, generating a first location in an inventory space based on the first data vector, wherein the inventory space has N dimensions and represents a plurality of inventory items, determining one or more data vectors that correspond to one or more inventory items based on the first location, and outputting the one or more data vectors via a graphical user interface.

2. The computer-implemented method of clause 1, wherein generating the first data vector comprises generating a profile based on metadata associated with a user, generating a weighted profile based on the profile and a first set of weight values, and combining the weighted profile with a second set of weight values to produce the first data vector.

3. The computer-implemented method of any of clauses 1-2, further comprising receiving input indicating a selection of an inventory item that is not included in the one or more inventory items, and modifying at least one of the first set of weights and the second set of weights based on the selection of the inventory item to generate an updated first data vector that corresponds to the inventory item that is not included in the one or more inventory items.

4. The computer-implemented method of any of clauses 1-3, wherein the first data vector comprises a plurality of attributes, and generating the first location comprises determining a separate coordinate within the inventory space for each attribute included in the plurality of attributes.

5. The computer-implemented method of any of clauses 1-4, wherein the inventory space comprises a plurality of data vectors having N dimensions, and each data vector included in the plurality of data vectors corresponds to a different inventory item included in the plurality of inventory items.

6. The computer-implemented method of any of clauses 1-5, wherein determining the one or more data vectors comprises computing a separate distance value between the first location and each data vector included in the plurality of data vectors, and determining at least one data vector included in the plurality of data vectors that resides closer to the first location than any other data vector included in the plurality of data vectors.

7. The computer-implemented method of any of clauses 1-6, wherein determining the one or more data vectors comprises determining a set of data vectors that reside proximate to the first location, and determining a subset of data vectors within the set of data vectors that reside closer to one another than to the first location.

8. The computer-implemented method of any of clauses 1-7, wherein the first data vector includes a first attribute that is not assigned a value, and further comprising assigning a value to the first attribute that is derived from a corresponding attribute associated with the one or more inventory items.

9. The computer-implemented method of any of clauses 1-8, wherein the first attribute comprises a price.

10. The computer-implemented method of any of clauses 1-9, wherein each of the one or more inventory items comprises a precious stone or semi-precious stone.

11. Some embodiments include a non-transitory computer-readable medium storing program instructions that, when executed by a processor, cause the processor to analyze inventories to generate one or more selections of inventory items by performing the steps of generating a first data vector based on one or more selection criteria, wherein the first data vector has N dimensions, and N comprises a positive integer value that represents a number of attributes associated with a given inventory item, generating a first location in an inventory space based on the first data vector, wherein the inventory space has N dimensions and represents a plurality of inventory items, determining one or more data vectors that correspond to one or more inventory items based on the first location, and outputting the one or more data vectors via a graphical user interface.

12. The non-transitory computer-readable medium of clause 11, wherein the step of generating the first data vector comprises generating a profile based on input received via the graphical user interface, generating a weighted profile based on the profile and a first set of weight values, combining the weighted profile with a second set of weight values to produce the first data vector, receiving input via the graphical user interface indicating a selection of an inventory item that is not included in the one or more inventory items, and modifying at least one of the first set of weights and the second set of weights based on the selection of the inventory item to generate an updated first data vector that corresponds to the inventory item that is not included in the one or more inventory items.

13. The non-transitory computer-readable medium of any of clauses 11-12, wherein the inventory space comprises a plurality of data vectors having N dimensions, and each data vector included in the plurality of data vectors corresponds to a different inventory item included in the plurality of inventory items.

14. The non-transitory computer-readable medium of any of clauses 11-13, wherein the step of determining the one or more data vectors comprises computing a separate distance value between the first location and each data vector included in the plurality of data vectors, and determining at least one data vector included in the plurality of data vectors that resides closer to the first location than any other data vector included in the plurality of data vectors.

15. The non-transitory computer-readable medium of any of clauses 11-14, wherein the step of determining the one or more data vectors comprises determining a set of data vectors that reside proximate to the first location, and determining a subset of data vectors within the set of data vectors that reside closer to one another than to the first location.

16. The non-transitory computer-readable medium of any of clauses 11-15, wherein the first data vector includes a first attribute that is not assigned a value, and further comprising the step of assigning a value to the first attribute that is derived from a corresponding attribute associated with the one or more inventory items, wherein the first attribute comprises a price.

17. The non-transitory computer-readable medium of any of clauses 11-16, wherein each of the one or more inventory items comprises a physical object, and wherein the first data vector indicates at least one physical attribute associated with physical objects.

18. The non-transitory computer-readable medium of any of clauses 11-17, wherein the first data vector indicates at least one of a carat value, clarity value, color value, cut type, shape, weight, and dimension associated with a precious stone.

19. The non-transitory computer-readable medium of any of clauses 11-18, wherein the one or more data vectors meet the one or more selection criteria.

20. Some embodiments include a system, comprising a memory storing a software application, and a processor that, when executing the software application, is configured to perform the steps of generating a first data vector based on one or more selection criteria, wherein the first data vector has N dimensions, and N comprises a positive integer value that represents a number of attributes associated with a given inventory item, generating a first location in an inventory space based on the first data vector, wherein the inventory space has N dimensions and represents a plurality of inventory items, determining one or more data vectors that correspond to one or more inventory items based on the first location, and outputting the one or more data vectors via a graphical user interface.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for analyzing inventories to generate one or more selections of inventory items, the method comprising:
   generating a first data vector based on one or more selection criteria;
   mapping the first data vector to a first template representing a generic inventory item;
   weighting the first template based on a first set of weights to generate a second data vector, wherein the second data vector has N dimensions, and N comprises a positive integer value that represents a number of attributes associated with a given inventory item;
   determining a first location in an inventory space based on the second data vector, wherein the inventory space has N dimensions and represents a plurality of inventory items;
   determining one or more data vectors that correspond to one or more inventory items based on the first location determined using the second data vector; and
   outputting the one or more data vectors via a graphical user interface.

2. The computer-implemented method of claim 1, wherein generating the first data vector comprises:
   generating a profile based on metadata associated with a user;
   generating a weighted profile based on the profile and a first set of weight values; and
   combining the weighted profile with a second set of weight values to produce the first data vector.

3. The computer-implemented method of claim 2, further comprising:
   receiving input indicating a selection of an inventory item that is not included in the one or more inventory items; and
   modifying at least one of the first set of weight values and the second set of weight values based on the selection of the inventory item to generate an updated first data vector that corresponds to the inventory item that is not included in the one or more inventory items.

4. The computer-implemented method of claim 1, wherein the first data vector comprises a plurality of attributes, and determining the first location comprises determining a separate coordinate within the inventory space for each attribute included in the plurality of attributes.

5. The computer-implemented method of claim 1, wherein the inventory space comprises a plurality of data vectors having N dimensions, and each data vector included in the plurality of data vectors corresponds to a different inventory item included in the plurality of inventory items.

6. The computer-implemented method of claim 5, wherein determining the one or more data vectors comprises:
   computing a separate distance value between the first location and each data vector included in the plurality of data vectors; and
   determining at least one data vector included in the plurality of data vectors that resides closer to the first location than any other data vector included in the plurality of data vectors.

7. The computer-implemented method of claim 5, wherein determining the one or more data vectors comprises:
   determining a set of data vectors that reside proximate to the first location; and
   determining a subset of data vectors within the set of data vectors that reside closer to one another than to the first location.

8. The computer-implemented method of claim 1, wherein the first data vector includes a first attribute that is not assigned a value, and further comprising assigning a value to the first attribute that is derived from a corresponding attribute associated with the one or more inventory items.

9. The computer-implemented method of claim 8, wherein the first attribute comprises a price.

10. The computer-implemented method of claim 1, wherein each of the one or more inventory items comprises a precious stone or semi-precious stone.

11. One or more non-transitory computer-readable media storing program instructions that, when executed by one or more processors, cause the one or more processors to analyze inventories to generate one or more selections of inventory items by performing the steps of:
    generating a first data vector based on one or more selection criteria;
    mapping the first data vector to a first template representing a generic inventory item;
    weighting the first template based on a first set of weights to generate a second data vector, wherein the second data vector has N dimensions, and N comprises a positive integer value that represents a number of attributes associated with a given inventory item;
    determining a first location in an inventory space based on the second data vector, wherein the inventory space has N dimensions and represents a plurality of inventory items;
    determining one or more data vectors that correspond to one or more inventory items based on the first location determined using the second data vector; and
    outputting the one or more data vectors via a graphical user interface.

12. The one or more non-transitory computer-readable media of claim 11, wherein the step of generating the first data vector comprises:
    generating a profile based on input received via the graphical user interface;
    generating a weighted profile based on the profile and a first set of weight values;

combining the weighted profile with a second set of weight values to produce the first data vector;

receiving input via the graphical user interface indicating a selection of an inventory item that is not included in the one or more inventory items; and modifying at least one of the first set of weight values and the second set of weight values based on the selection of the inventory item to generate an updated first data vector that corresponds to the inventory item that is not included in the one or more inventory items.

13. The one or more non-transitory computer-readable media of claim 11, wherein the inventory space comprises a plurality of data vectors having N dimensions, and each data vector included in the plurality of data vectors corresponds to a different inventory item included in the plurality of inventory items.

14. The one or more non-transitory computer-readable media of claim 13, wherein the step of determining the one or more data vectors comprises:

computing a separate distance value between the first location and each data vector included in the plurality of data vectors; and determining at least one data vector included in the plurality of data vectors that resides closer to the first location than any other data vector included in the plurality of data vectors.

15. The one or more non-transitory computer-readable media of claim 13, wherein the step of determining the one or more data vectors comprises:

determining a set of data vectors that reside proximate to the first location; and determining a subset of data vectors within the set of data vectors that reside closer to one another than to the first location.

16. The one or more non-transitory computer-readable media of claim 11, wherein the first data vector includes a first attribute that is not assigned a value, and further comprising the step of assigning a value to the first attribute that is derived from a corresponding attribute associated with the one or more inventory items, wherein the first attribute comprises a price.

17. The one or more non-transitory computer-readable media of claim 11, wherein each of the one or more inventory items comprises a physical object, and wherein the first data vector indicates at least one physical attribute associated with physical objects.

18. The one or more non-transitory computer-readable media of claim 11, wherein the first data vector indicates at least one of a carat value, clarity value, color value, cut type, shape, weight, and dimension associated with a precious stone.

19. The one or more non-transitory computer-readable media of claim 11, wherein the one or more data vectors meet the one or more selection criteria.

20. A system, comprising:

one or more memories storing a software application; and one or more processors that, when executing the software application, are configured to perform the steps of:

generating a first data vector based on one or more selection criteria, mapping the first data vector to a first template representing a generic inventory item, weighting the first template based on a first set of weights to generate a second data vector, wherein the second data vector has N dimensions, and N comprises a positive integer value that represents a number of attributes associated with a given inventory item, determining a first location in an inventory space based on the second data vector, wherein the inventory space has N dimensions and represents a plurality of inventory items, determining one or more data vectors that correspond to one or more inventory items based on the first location determined using the second data vector, and outputting the one or more data vectors via a graphical user interface.

* * * * *